Patented July 31, 1951

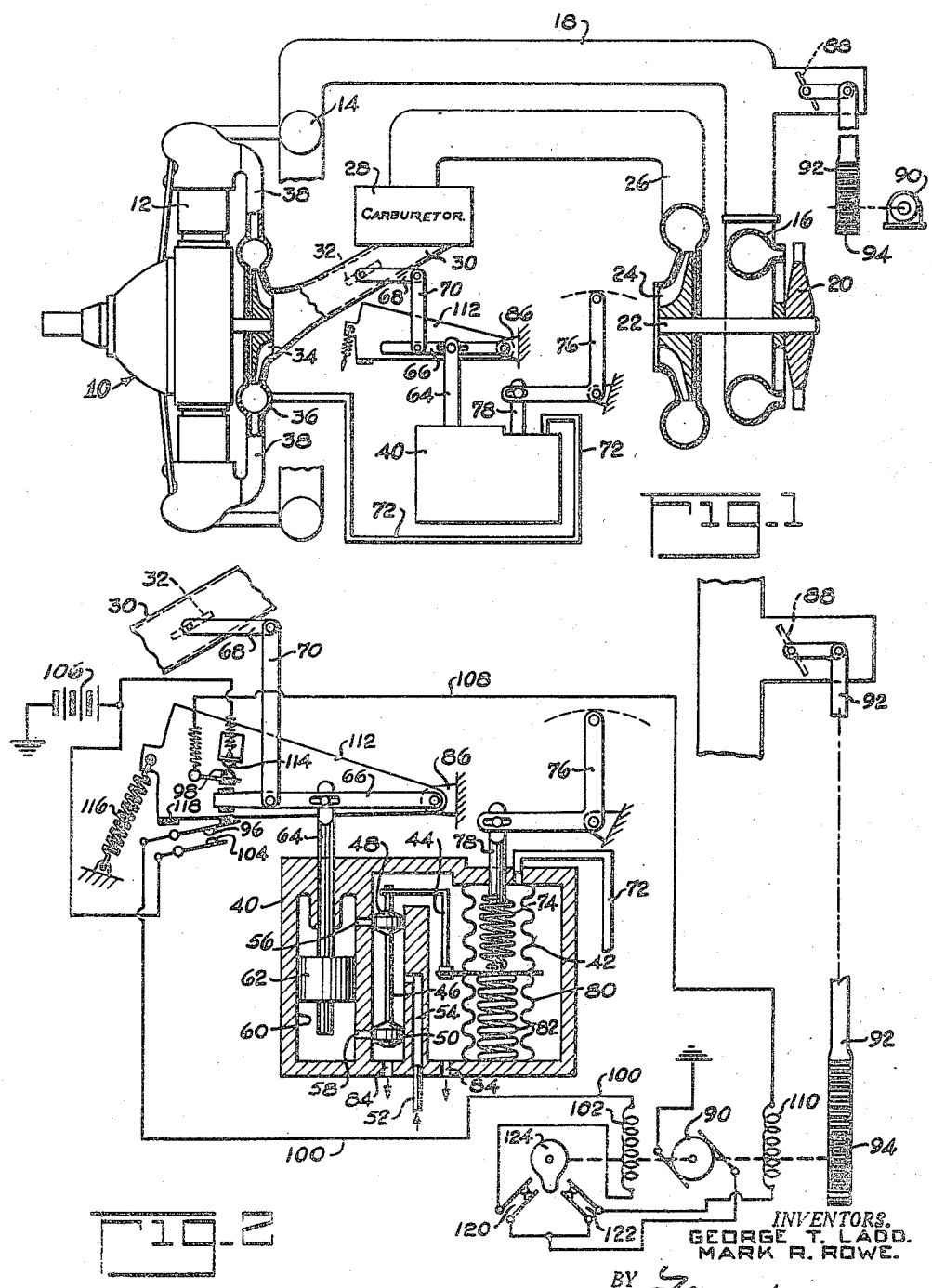

2,562,742

UNITED STATES PATENT OFFICE 2,562,742

MANIFOLD PRESSURE CONTROL HAVING VARIABLE SPEED SUPERCHARGER RESPONSIVE TO THROTTLE MOVEMENT

Mark Robert Rowe, Teaneck, and George T. Ladd, Packanack Lake, N. J., assignors to Wright Aeronautical Corporation, a corporation of New York Application March 13, 1946, Serial No. 654,195

9 Claims. (Cl. 60—13)

This invention relates to a power control system for an engine equipped with means for effecting an increase in engine power when the engine air control throttle valve has reached its full open position. The invention more particularly is directed to a power control system for an aircraft engine so equipped in which a single lever controls the engine throttle as well as the speed of its supercharger.

In the past, aircraft engines equipped, for example, with a turbo supercharger have had a control for the engine throttle and a separate control for the turbo supercharger. Similarly, in the past, aircraft engines equipped with a multi-speed engine driven supercharger have had separate controls for the supercharger speed and the engine throttle. It is an object of this invention to combine such separate controls into a single automatic control. It is a further object of this invention to provide an automatic control for the engine throttle and the variable speed supercharger such that the supercharger is not used, or at least its speed is not increased, until the throttle is substantially at its full open position. In this way, the engine is automatically operated at maximum efficiency as far as control of its throttle and supercharger is concerned. Also, with such an engine control of the present invention, the operator is only required to set the control for the desired manifold pressure and he does not have to be concerned with the control of the speed of the supercharger.

Other objects of this invention will become apparent upon reading the annexed detailed description in connection with the drawing in which:

Figure 1 is a schematic view of an aircraft engine equipped with a turbo-supercharger;

Figure 2 is a schematic view of a manifold pressure control for Figure 1 and embodying the present invention;

Figure 3:
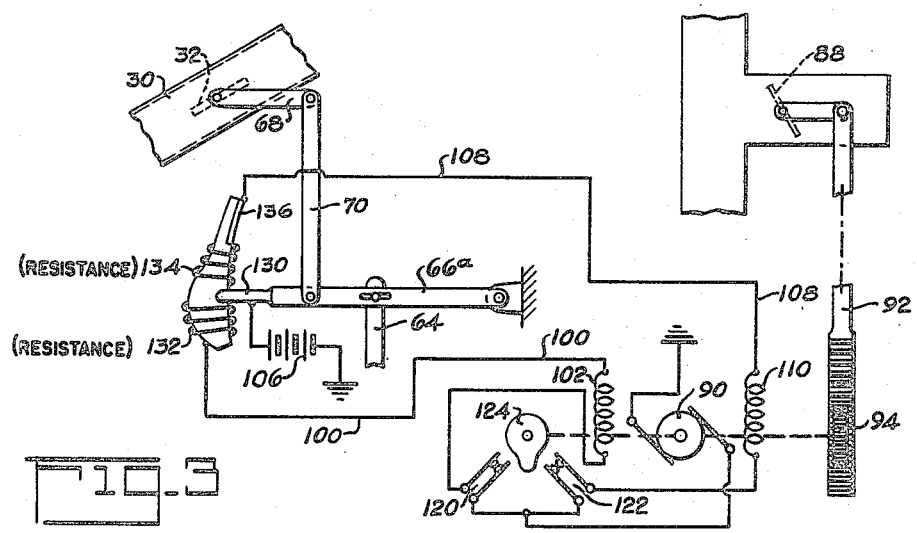
Figure 3 is a schematic view of a modification of Figure 2.

Referring first to Figures 1 and 2, a conventional aircraft engine, generally indicated at 10, is provided with a plurality of cylinders 12. The engine cylinders exhaust into an annular manifold 14 from which the engine exhaust gases are transmitted to an annular turbo nozzle box 16 through a conduit 18. The exhaust gases discharge from the nozzle box 16 against the blades of a turbine rotor 20 mounted on a shaft 22. A supercharger impeller 24 is also mounted on the shaft 22 for operation by the turbine rotor. The supercharger impeller compresses air into a duct 26 connected with the intake side of a carburetor 28. From the carburetor 28, the engine air or combustion mixture is supplied through a duct 30 having a throttle valve 32. Preferably, the engine is also equipped with an engine driven supercharger 34 which compresses the air or combustion mixture from the duct 30 into an annular manifold 36 from which it is distributed to the various engine cylinders through intake pipes 38.

The throttle valve 32 is automatically controlled by a regulator 40, best seen in Figure 2. The regulator 40 comprises a bellows 42 having one end secured to the housing of the regulator. The free end of the bellows 42 is secured to a movable servo valve 46. The valve 46 is provided with a pair of spaced annular lands or enlargements 48 and 50 which control the admission of a suitable fluid pressure, such as engine oil pressure, from a conduit 52 and a passage 54 to passages 56 and 58 opening into opposite ends of a cylinder 60. A piston 62, disposed within the cylinder 60, is provided with a piston rod 64 pivotally connected to a lever 66 which, in turn, is connected to the throttle valve arm 68 by a link 70.

The interior of the bellows 42 is in communication with the intake manifold 36 through the conduit 72 and a tension spring 74 resists expansion of the bellows 42 by this pressure. The tension of the spring 74 can be adjusted by a bell crank lever 76 which is connected to the spring 74 by a link 78. Obviously, a suitable seal may be disposed between the housing 40 and the link 78. With this construction, upon an increase in pressure within the manifold 36, the bellows 42 expands and lowers the valve 46 whereupon fluid pressure is admitted from the passage 54 through the passage 58 to the underside of the piston 62. Accordingly, the piston 62 is moved upwardly by this fluid pressure to effect a closing adjustment of the throttle valve 32. Similarly, a decrease in the engine intake manifold pressure results in an opening adjustment of the throttle valve 32. In this way, the regulator 40 is automatically operative to maintain a substantially constant manifold pressure as determined by the adjustment of the spring 74 and the position of the lever 76 determines the pressure setting of the regulator. In order to compensate for variations in atmospheric pressure, the bellows 42 is arranged to act against a sealed bellows 80. The bellows 80 is at least partially evacuated and is urged outwardly by a spring 82 under suitable compression. The housing of the regulator 40 is also provided with suitable drain or vent passages 84. The structure of the regulator 40 so far described is quite conventional and forms no part of the present invention and any suitable regulator may be substituted therefor. It is also conventional to provide for adjustment of the pivot 86 of the lever 66 either simultaneously with adjustment of the bell crank lever 76 or by a separate adjusting means.

As the aircraft engine goes up in altitude, the engine intake manifold pressure tends to decrease because of the decreasing density of the air. However, the regulator 40 automatically operates to effect opening adjustments of the throttle valve 32 to maintain the manifold pressure for which the regulator 40 is set. After an altitude is reached at which the throttle 32 is fully opened by the regulator in order to maintain the desired manifold pressure, any further increase in altitude necessarily results in a decrease in engine manifold pressure unless other means are provided to increase the pressure of the air supplied to the engine. Also, obviously, after the throttle valve is fully opened, no further increase in engine manifold pressure can be obtained merely by setting the regulator 40 for a higher pressure. Accordingly, when the throttle is fully or substantially fully opened, the turbo-supercharger 24 is operated whereby a higher manifold pressure is possible or a given manifold pressure may be maintained to still higher altitudes.

The turbo-supercharger is controlled by a waste gate 88 which, when open, by-passes the engine exhaust gases around the turbine rotor 20. Accordingly, when the engine throttle 32 can be opened no farther, the waste gate 88 is given a closing adjustment whereby the turbine nozzle box is supplied with engine exhaust gases to drive the turbine rotor and, therefore, the turbine supercharger impeller is driven to increase the engine intake manifold pressure. The waste gate 88 is adjusted by an electric motor 90, the rotor of which is connected to the waste gate by means schematically indicated as a rack 92 and a pinion 94 drivably connected to said rotor.

As best seen in Figure 2, the waste gate motor 90 is controlled by the position of the throttle adjusting lever 66. The lever 66 is arranged to engage and move the arms carrying switch contacts 96 and 98. The switch contact 96 is connected by a wire 100 to one end of a waste gate motor series field winding 102 and is arranged to engage or disengage a fixed contact 104 connected with a source of electric energy 106. The switch contact 98 is connected by a wire 108 to one end of a second waste gate motor series field winding 110 and is movably mounted on a plate 112 for engagement or disengagement with a contact 114 fixedly mounted on the plate 112 and also connected with said source of electric energy 106. The plate 112 is mounted for rotation about the pivot 86 and is urged by a spring 116 in the direction of throttle valve opening movement of the lever 66 toward a fixed stop 118. The other end of the windings 102 and 110 are connected, respectively, through limit switches 120 and 122 to the motor 90 which, as illustrated, is connected back to the source of electric energy through a ground return. When the winding 102 is energized, the motor 90 operates to effect a closing adjustment of the waste gate 88 and, when the winding 110 is energized, the motor 90 operates to effect an opening adjustment of the waste gate. The motor 90 is drivably connected to a cam 124 adapted to open the limit switch 120 when the waste gate is fully closed to prevent further energization of the waste gate closing winding 102 and the cam 124 is adapted to open the limit switch 122 when the waste gate is fully opened to prevent further energization of the waste gate opening winding 110.

The arrangement of the switch contacts 96 and 98 and the stop 118 is such that whenever the throttle 32 is between its closed position and a substantially fully open position—say 7° of its full open position—the spring 116 is effective to move the plate 112 so that the contacts 98 and 114 are closed against the throttle positioning lever 66. Accordingly, with the throttle 32 in this range, a circuit is completed to the waste gate opening winding 110 if the limit switch 122 is closed whereby the waste gate is maintained fully opened. As the aircraft goes up in altitude, or as the manifold pressure setting of the regulator 40 is increased, the regulator 40 continues to open the throttle 32 to maintain the manifold pressure for which the regulator is set and, when the throttle is only 7° from its full open position, the plate 112 engages the stop 118. Therefore, upon further throttle valve opening movement of the lever 66, the spring 116 is no longer effective to cause the plate 112 to follow the throttle valve positioning lever 66 whereupon the contacts 98 and 114 separate. Upon further increase in altitude, or in the pressure setting of regulator 40, the regulator 40 continues to open the throttle and, when the throttle moves beyond said 7° range to its full open position, the throttle actuating lever 66 closes the contacts 96 and 104 thereby completing a circuit through the waste gate closing winding 102 and effecting a closing adjustment of the waste gate 88. As a result, the engine intake manifold pressure increases and the regulator 40 effects a closing adjustment of the throttle 32 to maintain the manifold pressure for which the regulator is set and, at the same time, the contacts 96 and 104 are separated as a result of this throttle closing adjustment. The arrangement is such that the throttle 32 returns to said 7° range but does not close sufficiently to again engage contacts 98 and 114 as a result of this closing adjustment of the waste gate. That is, the angle between the position of the lever 66 at which the contacts 98 and 114 separate and its position at which the contacts 96 and 104 close, although corresponding to only a small throttle angle, is sufficiently large that the lever 66 does not again close the contacts 98 and 114 as a result of the closing adjustment of the throttle 32 following the closing adjustment of the waste gate 88. The magnitude of this angle depends on the particular installation and the aforementioned 7° throttle angle has merely been given by way of example. As the aircraft continues to rise, or upon a further increase in the pressure setting of the regulator 40, the regulator 40 will again move the throttle beyond said 7° range to its full open position to maintain the desired manifold pressure whereupon the contacts 96 and 104 will again close to effect a further adjustment of the waste gate.

When the aircraft descends from a high altitude, or when the pressure setting of the regulator 40 is decreased, the regulator 40 will effect closing adjustments of the throttle to maintain the desired manifold pressure and, when the throttle closes beyond said 7° range, the contacts 98 and 114 close to energize the waste gate winding 110 thereby effecting opening adjustments of the waste gate 88. These opening adjustments of the waste gate continue as the aircraft descends or as the regulator pressure setting is decreased until the waste gate is fully opened. Thereafter, as the aircraft descends, the regulator 40 closes the throttle 32 beyond said 7° range to prevent the manifold pressure from rising above the value for which the regulator is set.

With this construction, the throttle 32 and the waste gate 88 are so controlled that the turbo-supercharger is not used until the throttle is almost fully open and then, if additional manifold pressure is required to maintain the pressure for which the regulator 40 is set, or if the pressure setting of the regulator is increased, the turbo-supercharger automatically supplies such additional pressure as is required to provide the desired manifold pressure and still keep the throttle substantially fully open. In this way, the turbo-supercharger does not add to the engine exhaust back pressure until the manifold pressure can no longer be maintained by opening adjustments of the throttle. Also, with this automatic control, the turbo-supercharger does not compress and heat the engine air to a large extent only to have the regulator 40 effect a large closing adjustment of the throttle in order to reduce the manifold pressure to the value for which the regulator is set.

As described, the switch contacts 96 and 104 and the contacts 98 and 114 are open in the neutral range of the lever 66—that is, between its full open throttle position and its position corresponding to a throttle position 7° from full open. At the full open throttle position, the contacts 96 and 104 are closed and between 7° from full open and the closed throttle position the contacts 98 and 114 are closed. Now, if for example, when the contacts 96 and 104 close, the speed of closing adjustment of the waste gate 88 is too fast, then the air pressure supplied to the engine throttle may increase to such an extent that the resulting closing adjustment of the throttle by the regulator 40 may be more than the aforementioned 7°. Thereupon, the switch contacts 98 and 114 will close and, if the resulting opening adjustment of the waste gate is too rapid, the throttle may again move to its full open position to engage the contacts 96 and 104. Accordingly, the throttle and waste gate may hunt back and forth unless, for example, the aforementioned 7° throttle angle is increased or the speed of adjustment of the waste gate is reduced.

Figure 3 illustrates a modification of Figure 2 in which, when there is a relatively large change in the throttle position, a fast adjustment of the waste gate is provided without any resulting hunting even though only a small throttle angle is provided between its full open position and the position at which the waste gate opening winding is energized. The systems of Figures 2 and 3 are quite similar so that a complete description of Figure 3 appears unnecessary and similar parts of Figures 2 and 3 have been indicated by similar reference numerals.

In Figure 3, a throttle positioning lever 66a, corresponding to the lever 66, has an electric contact 130 at its outer end connected to a source of electric energy 106 and adapted to engage and move across a pair of resistances 132 and 134. The inner edges of the resistances 132 and 134 define a circular arc formed about the pivot axis of the lever 66a and the resistances 132 and 134 are angularly spaced to define a neutral range for the lever 66a therebetween and substanaially at the full open throttle position of the lever. The end of the resistance 132 remote from this neutral position is connected to the waste gate motor winding 102 by the wire 100. The remote end of the resistance 134 is connected to the waste gate motor winding 110 by the wire 108 and a contact bar 136 engageable by the lever contact 130 when the lever 66a approaches its throttle closed position.

The resistance 132 is arranged for engagement by the contact 130 just before the lever 66a reaches its full open throttle position. As previously stated, the resistance 134 is separated from the resistance 132 by only a small angle and, therefore, the resistance 134 is arranged for engagement by the contact 130 when the lever 66a is only a small throttle angle from its full open position.

With this construction, if the lever 66a moves only slightly from its neutral range to engage only the adjacent end of the resistance 132 or 134, the electric circuit to the appropriate waste gate motor winding is completed through a substantial resistance so that the waste gate motor operates relatively slow. However, if the lever 66a deflects sufficiently in either direction from its neutral position to cut out a large portion of the resistance 132 and 134, then the waste gate motor initially operates relatively fast and its speed slows up as the lever 66a is returned to its neutral position by the regulator 40. This stabilizing effect may be increased by winding the resistance so that a given angular deflection of the lever 66a along either resistance cuts more resistance in or out than the same angular deflection of the lever at a point more remote from its neutral position. For example, as illustrated, the diameter of the circular turns of the wire of the resistances 132 and 134 decrease away from the neutral position of the lever 66a.

In Figures 2 and 3, the levers 66 and 66a control electric circuits for effecting adjustment of the waste gate. It is also within the scope of this invention to provide hydraulic means for adjusting the waste gate. In addition, instead of controlling the speed of a variable speed turbo super-charger, the control may be used for adusting the speed of an engine driven supercharger. These features are combined in the modification illustrated in Figures 4 and 5 in which means are provided for controlling the speed of both a multi-speed engine driven supercharger and a turbo supercharger.

Figure 4:
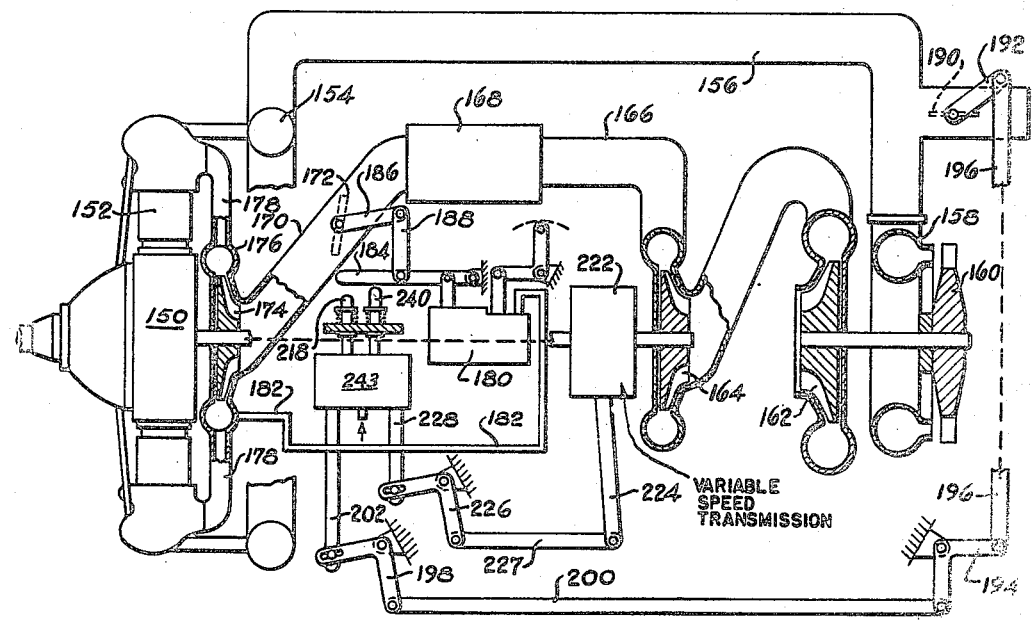
Figure 4 is a schematic view of an aircraft engine equipped with both a multi-speed engine driven supercharger and a turbo-supercharger.
Figure 5:
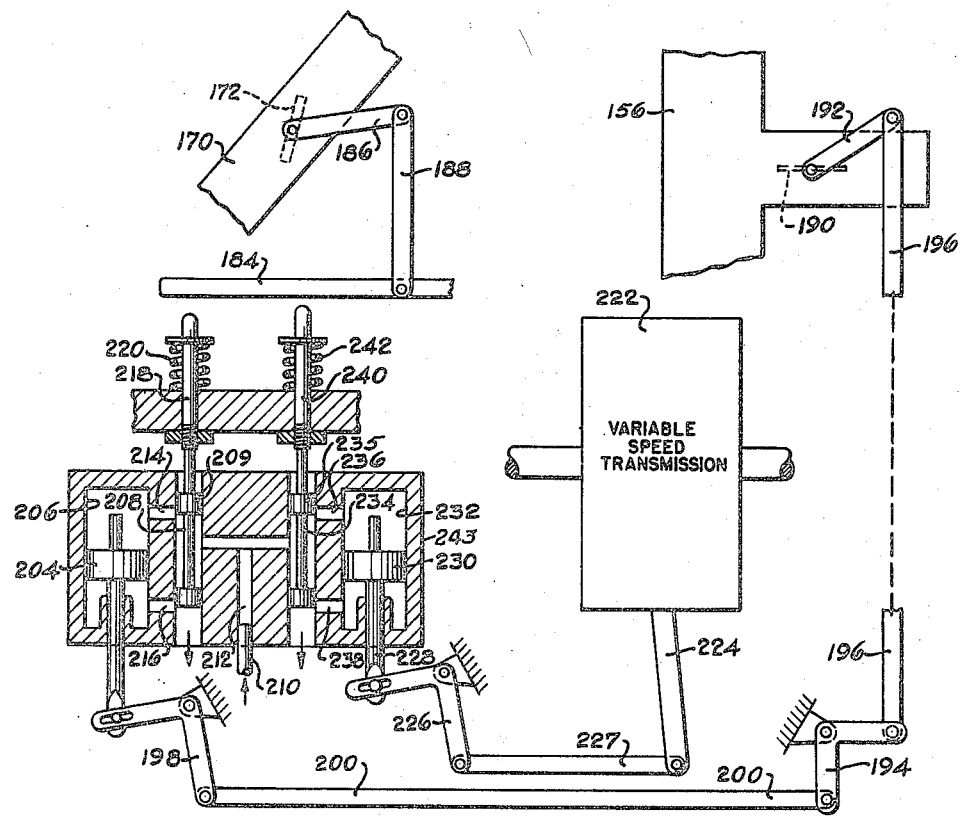
Figure 5 is a schematic view illustrating the manifold pressure control of Figure 4.

In Figures 4 and 5, an aircraft internal combustion engine 150 is provided with cylinders 152 from which the combustion gases exhaust into an annular duct 154. A duct 156 transmits the combustion gases from the annular duct 154 to an annular turbine nozzle box 158. The turbine nozzle box is arranged to discharge its exhaust gases against the blades of a turbine rotor 160 which is drivably connected to a supercharger impeller 162. The impeller 162 is arranged to supply compressed air to the intake side of a variable speed engine driven supercharger 164. The supercharger 164 discharges compressed air into a duct 166 from which the air passes through a carburetor 168 to a duct 170 having a conventional throttle valve 172. The engine may also be equipped with a second engine driven supercharger 174 which further compresses the air or combustion mixture into an annular intake manifold 176 from which it is distributed to the various engine cylinders through intake pipes 178.

The throttle valve 172 is controlled by a regulator 180 in response to the engine intake manifold pressure transmitted to the regulator through the conduit 182. The regulator 180 may be similar to the regulator 40 illustrated in Figure 2 whereby the regulator 180 automatically controls the position of the valve 172 to maintain a substantially constant pressure in the manifold 176. The regulator 180 has a throttle valve adjusting lever 184 connected to a throttle valve arm 186 by a link 188, the lever 184 corresponding to the lever 66 or 66a of Figures 2 and 3 respectively.

The speed of the turbo supercharger is controlled by the waste gate 190 which controls a by-pass for the engine exhaust gases around the turbine nozzle box 158 and turbine rotor 160. As schematically illustrated, the waste gate arm 192 is connected to a bell crank lever 194 by a link 196 and thence to a second bell crank lever 198 by a second link 200. A piston rod 202 serves to connect the bell crank lever 198 to a piston 204 slidable within a cylinder 206. A servo valve 208 has enlargements or lands 209 arranged to control the admission of a suitable fluid pressure, such as engine oil pressure, from a conduit 210 and passage 212 to one end or the other of the cylinder 206 through passages 214 or 216. The valve 208 has a stem 218 and a spring 220 acts on the stem to urge the valve upwardly to the position illustrated in which fluid pressure is admitted to the top of the piston 204 through the passage 214 to move the waste gate to its full open position.

The speed of the supercharger 164 is controlled by a variable speed transmission 222 which may provide a stepped multi-step drive for the supercharger from the engine but preferably, and as assumed in the following description, the transmission 222 provides a progressively variable speed drive—for example, such as disclosed by Patent No. 2,079,683 to R. Chilton. The transmission 222 is provided with a speed ratio control lever 224 connected to a bell crank lever 226 which in turn is connected to a piston 230 slidable within a cylinder 232. A servo valve 234 has lands or enlargements 235 arranged to control the admission of fluid pressure from the conduit 210 and passage 212 to one end or the other of the cylinder 232 through passages 236 or 238. The valve 234 is provided with a stem 240 urged upwardly by a spring 242 for moving the valve to the position illustrated in which fluid pressure is admitted to the top of the piston through passage 236 for moving the speed ratio control lever 224 to its zero or minimum supercharger speed position. As illustrated, the servo valves 208 and 234 and the pistons 204 and 230 respectively controlled by said valves are disposed in a common housing 243.

As in the previous modifications, as the aircraft goes up in altitude, or as the pressure setting of the regulator 180 is increased, the regulator 180 automatically moves the lever 184 to effect opening adjustments of the throttle 172 in order to maintain the engine intake manifold pressure for which the regulator is set. The valve stems 218 and 240 both extend into the path of movement of the lever 184 as it approaches its full open throttle position. Arrangement is such that, as the lever 184 is substantially at and approaches its full open throttle position, the lever 184 first engages the valve stem 240 to lower the valve 234 against the spring 242 thereby admitting fluid pressure through the passage 238 to the bottom of the piston 230. Admission of fluid pressure to the bottom of the piston 230 moves the piston upwardly thereby moving the speed ratio control lever 224 to start or increase the speed of the supercharger 164. As a result of the increase in speed of the supercharger 164, the regulator 180 effects a closing adjustment of the throttle 172 in order to keep the engine intake manifold pressure constant and thereby closing the passage 238. As the aircraft goes up in altitude or the pressure setting of the regulator 180 is increased, the lever 184 continues to effect adjustment of the valve 234 for increasing the speed of the supercharger 164 until the supercharger is being operated at its maximum speed ratio. Thereafter, any further opening adjustment of the throttle results in an adjustment of the valve 208 against its spring 220 by the lever 184 to admit fluid pressure to the bottom of the piston 204 through the passage 216. The piston 204 thereupon moves upwardly for effecting a closing adjustment of the waste gate 190.

When the aircraft descends, or the regulator 180 is set for lower pressures, the throttle adjusting lever 184 first permits the spring 220 to effect upward adjustments of the valve 208 to admit fluid pressure to the top of the piston 204 through passage 214 thereby gradually opening the waste gate while the throttle remains substantially fully open. When the waste gate is fully open, any further descent of the aircraft or any lower setting of the pressure regulator results in a small closing adjustment of the throttle such that the spring 242 effects an upward adjustment of the valve 234 to admit fluid pressure to the top of the piston 230 through passage 236 to reduce the speed of the supercharger 164 while the throttle is still substantially fully open.

As illustrated, the lands or enlargements 209 of the valve 208 are slightly longer than the width of the passages 214 and 216 controlled thereby. Therefore, a small but finite movement of the valve 208 is required in moving from its position in which fluid pressure is just cut off from the passage 214 to its position at which fluid pressure is admitted to the passage 216. This small movement of the valve 208 defines a neutral range for the valve and lever 184 in which no adjustment of the waste gate is effected. With this construction, when, for example, the valve 208 is lowered to admit fluid pressure to the bottom of the piston 204 through passage 214 to effect a closing adjustment of the waste gate, the resulting small closing adjustment of the throttle 172 by the regulator 180 is not sufficient to permit the valve to again admit fluid pressure through the passage 214 to the top of the piston. Thus, the neutral range for the valve 208 and lever 184 corresponds to the aforedescribed neutral range of the levers 66 and 66a whereby hunting of the waste gate and throttle is avoided. The valve 234 has a similar neutral range to avoid hunting of the speed ratio of the transmission 222.

At this point, it should be noted in Figures 4 and 5, the automatic waste gate control may be used without the automatic speed control of the transmission 222 and vice versa. Also, the sequence at which the superchargers 162 and 164 are operated obviously may be reversed from that described.

In the aforedescribed modifications, the engine throttle 32 or 172 is positioned respectively by a regulator 40 or 180 which is automatically responsive to engine intake manifold pressure for maintaining this pressure constant. This pressure is substantially proportional to the engine output torque and therefore to the engine power at constant engine speed. Obviously, the throttle regulator may be responsive to any pressure proportional to engine power or torque for maintaining this pressure constant thereby controlling the engine power or torque. For example, a pressure derived directly from the engine output torque could be used. Patent No. 2,289,285 to R. Chilton discloses such a fluid pressure torque meter.

As illustrated and described in connection with the aforementioned modifications, the invention is particularly directed to an engine equipped with a variable speed supercharger in which, when the engine throttle valve is fully open, a further increase in engine power is obtained by increasing the speed of the supercharger. However, the invention is not limited to the use of a supercharger for increasing the engine torque and therefore engine power when the engine throttle is fully open. For example, when the engine throttle is fully open, it may be possible to increase the engine torque and power by changing the fuel-air ratio of the combustion mixture. Thus, the throttle positioning levers 66, 66a or 180 each could be arranged to adjust a conventional fuel-air ratio mixture control when its associated throttle was fully open. As a further modification, each of the levers 66, 66a or 184 could be arranged to effect the addition of fuel and oxygen from some source other than the atmosphere when its associated throttle is fully open, as for example a supply of liquid oxygen or nitrous dioxide. In each of these latter two modifications, the throttle positioning regulator would have to be responsive to some pressure other than engine intake manifold pressure. This is so since, when the fuel-air ratio is adjusted or fuel and non-atmospheric oxygen are added to the engine in order to increase the engine torque, the engine intake manifold pressure is no longer proportional to the engine torque. Therefore, some other pressure which is substantially proportional to the engine torque must be used—for example, the throttle positioning regulator could be controlled by the aforementioned engine torque meter pressure.

Figure 6:
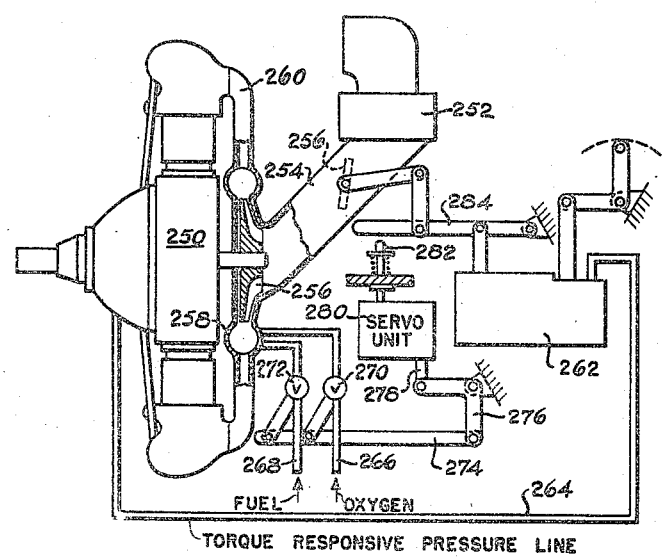
Figure 6 schematically illustrates a further modification.

By way of example, Figure 6 schematically illustrates the aforementioned modification in which oxygen from a source other than the atmosphere is introduced into the engine when the engine throttle valve reaches its fully open or substantially open position. As illustrated in Figure 6, an engine 250 is provided with a carburetor 252 to which atmospheric air is supplied and transmitted to a duct 254 provided with a throttle valve 256. Preferably, the engine is also provided with an engine driven supercharger 256 which compresses the air or combustion mixture into a manifold 258 from which it is distributed to the various engine cylinders through intake pipes 260. The engine is also provided with a throttle positioning regulator 262 which preferably is similar to the previously described regulator 40 or 180 except the regulator 262 is responsive to a pressure transmitted through the conduit 264 and controlled by apparatus measuring the engine output torque. This torque measuring apparatus has not been illustrated but it may be similar to that disclosed in the aforementioned Patent No. 2,289,285.

A conduit 266 is connected to a suitable non-atmospheric source of oxygen under pressure and a conduit 268 is connected to a suitable source of fuel under pressure. Jointly operable valves 270 and 272 are adapted to control the admission of a fuel through conduits 266 and 268 directly into the engine intake manifold 258. The valves 270 and 272 are connected by a link 274 to a bell crank lever 276 which in turn is connected to a piston rod 278. The piston rod 278 is part of a servo unit 280 controlled by a servo valve having a stem 282. The structure of the servo unit 280 preferably is similar to each servo valve and piston unit disclosed in Figure 5. Also, as in Figure 5, the servo valve stem 282 is adapted to be controlled by a throttle valve positioning lever 284.

The arrangement of Figure 6 is such that, with the throttle 256 substantially fully open, then upon any further opening adjustment of the throttle 256, the servo valve stem 282 operates to cause movement of the piston rod 278 to effect an opening adjustment of the valves 270 and 272 by means of the lever 276 and link 274 whereby additional fuel and oxygen are supplied to the engine to increase its power. This increase in power results in an increase in the torque meter pressure in conduit 264 and therefore the regulator 262 effects a slight closing adjustment of the throttle to maintain the pressure for which the regulator is set, said pressure being obtained from a torque meter disposed within the crankcase of the engine as disclosed in aforementioned Chilton Patent No. 2,289,285. Accordingly, it should be apparent that the operation of Figure 6 is generally similar to that of the previous modifications except, instead of controlling the speed of the supercharger when the engine throttle is fully open, in order to increase the engine power or to maintain the engine power to higher altitudes, a separate supply of non-atmospheric oxygen and fuel are controlled. Also, it should be apparent that the servo motor unit 280 could control some other means for adjusting the engine power after the engine throttle is substantially fully open. For example, the servo unit could control the previously mentioned fuel-air ratio mixture control. As a further modification, the speed of the engine may be maintained at some predetermined value until the engine throttle valve is substantially fully open whereupon the servo unit 280 could operate to adjust the setting of a conventional engine speed governor for increasing the engine speed. To this end, the engine would be provided with a governor (not shown) comprising means responsive to engine speed for controlling the pitch angle of the propeller blades for maintaining the speed of the engine at the value for which the governor is set, as is conventional practice on aircraft engines and as disclosed, for example, in Patent No. 2,204,640 to E. E. Woodward.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A control system for an engine having an air intake passage, a valve in said passage, and means other than said valve for varying an operating condition of said engine indicative of its torque output; said system comprising mechanism for automatically positioning said valve in response to changes in said condition; and means automatically operable in response to operation of said mechanism effecting opening movement of said valve beyond a predetermined range of its movement adjacent to its full open position for also effecting torque increasing adjustment of said first mentioned means and automatically operable in response to operation of said mechanism effecting closing movement of said valve beyond said range for also effecting torque decreasing adjustment of said first mentioned means.

2. A control system for an engine having an air intake passage, a valve in said passage, and a variable speed supercharger operable to compress the air supplied through said passage; said system comprising mechanism for automatically positioning said valve; and means automatically operable in response to operation of said mechanism effecting opening movement of said valve beyond a predetermined range of its movement adjacent to its full open position for also effecting an increase in the speed of said supercharger and automatically operable in response to operation of said mechanism effecting closing movement of said valve beyond said range for also effecting a decrease in the speed of said supercharger.

3. A control system for an engine having an air intake passage, a valve in said passage, and a variable speed supercharger operable to compress the air supplied through said passage; said system comprising mechanism resepansive to an increase or decrease in the pressure of the engine intake air for effecting a closing or opening adjustment, respectively, of said valve; and means automatically operable only in response to operation of said mechanism effecting opening movement of said valve beyond a predetermined range of its movement adjacent to its full open position for also effecting an increase in the speed of said supercharger and automatically operable only in response to operation of said mechanism effecting closing movement of said valve beyond said range for also effecting a decrease in the speed of said supercharger.

4. A control system for an engine as recited in claim 3 and including a turbine arranged to be driven by the engine exhaust gases and drivably connected to said supercharger and in which control system said automatically operable means includes an exhaust gas valve for varying the speed of said turbine.

5. A control system for an engine as recited in claim 3 and including a multi-speed transmission arranged to drivably connect said engine and supercharger for providing a variable speed drive for said supercharger.

6. A control system for an engine having an air intake passage, a valve in said passage, and a variable speed supercharger operable to compress the air supplied through said passage; said system comprising mechanism responsive to a condition of said engine indicative of its torque output for effectiing a closing or opening adjustment of said valve with increase or decrease, respectively, of said torque; and means automatically operable only in response to operation of said mechanism effecting opening movement of said valve beyond a predetermined range of its movement adjacent to its full open position for also effecting an increase in the speed of said supercharger and automatically operable only in response to operation of said mechanism effecting closing movement of said valve beyond said range for also effecting a decrease in the speed of said supercharger.

7. A control system for an engine having an air intake passage, a valve in said passage, a supercharger operable to compress the air supplied through said passage, and means operable for varying the speed of said supercharger relative to that of said engine; said system comprising mechanism responsive to an increase or decrease in the pressure of the engine intake air for effecting a closing or opening adjustment, respectively, of said valve; and means automatically operable in response to operation of said mechanism effecting opening movement of said valve beyond a predetermined range of its movement adjacent to its full open position for also effecting operation of said speed varying means at a rate dependent on the magnitude of said opening movement and in a direction for increasing the speed of said supercharger and automatically operable in response to operation of said mechanism effecting closing movement of said valve beyond said range for also effecting operation of said speed varying means at a rate dependent on the magnitude of said closing movement and in a direction for decreasing the speed of said supercharger.

8. In combination with an engine having an air intake passage, a valve in said passage, a pair of serially disposed variable speed superchargers for compressing the air supplied through said passage, a turbine drivably connected to one of said superchargers and arranged to be driven by the engine exhaust gases for driving said one supercharger, and a multispeed transmission for drivably connecting the other of said superchargers with said engine; a control system for said engine comprising mechanism responsive to a condition indicative of the engine torque output for effecting closing or opening adjustment of said valve with increase or decrease, respectively, of said torque; and means operable upon a demand for more engine torque, when the speed of both said superchargers is a minimum for opening said valve, and upon a demand for still more torque, when said valve is substantially fully open and the speed of both said superchargers is a minimum, for increasing the speed of only one of said superchargers and, only upon a demand for still more torque, when said valve is substantially fully open and the speed of said one supercharger is a maximum, for increasing the speed of said other supercharger.

9. In combination with an engine having an air intake passage, a valve in said passage, a pair of serially disposed variable speed superchargers for compressing the air supplied through said passage, a turbine drivably connected to one of said superchargers and arranged to be driven by the engine exhaust gases for driving said one supercharger, and a multispeed transmission for drivably connecting the other of said superchargers with said engine; a control system for said engine comprising mechanism responsive to a condition indicative of the engine torgue output for effecting closing or opening adjustment of said valve with increase or decrease, respectively, of said torque; means automatically operable in response to operation of said mechanism effecting opening movement of said valve beyond a predetermined range of movement adjacent to its full open position for also effecting a change in the speed ratio of said transmission to increase the speed of said engine driven supercharger and automatically operable in response to operation of said mechanism effecting closing movement of said valve beyond said range for also effecting a change in the speed ratio of said transmission to decreases the speed of said engine driven supercharger; and means automatically operable in response to operation of said mechanism effecting opening movement of said valve beyond a second predetermined range of its movement adjacent to its full open position for also effecting an increase in the speed of said turbine driven supercharger and automatically operable in response to operation of said mechanism effecting closing movement of said valve beyond said second predetermined range for also effecting a decrease in the speed of said turbine driven supercharger, said second predetermined range of valve movement being closer to the full open position of said valve than said first predetermined range.

MARK ROBERT ROWE.
GEORGE T. LADD.

REFERENCES CITED

The following references are of record in the file of this patent:

UNITED STATES PATENTS

| Number | Name | Date |
|---|---|---|
| 2,127,460 | Chilton | Aug. 16, 1938 |
| 2,297,235 | Müller | Sept. 29, 1942 |
| 2,305,810 | Müller | Dec. 22, 1942 |
| 2,355,759 | Stokes | Aug. 15, 1944 |
| 2,403,398 | Reggio | July 2, 1946 |
| 2,403,399 | Reggio | July 2, 1946 |
| 2,405,309 | Jorgensen | Aug. 6, 1946 |
| 2,437,546 | Meripol | Mar. 9, 1948 |
| 2,476,063 | Ridgley | July 12, 1949 |
| 2,500,234 | Bates | Mar. 14, 1950 |

Notice of Adverse Decision in Interference

In Interference No. 88,090 involving Patent No. 2,562,742, M. R. Rowe and G. T. Ladd, Manifold pressure control having variable speed supercharger responsive to throttle movement, final judgment adverse to the patentees was rendered Feb. 18, 1957, as to claims 3, 4, and 6.

[*Official Gazette April 9, 1957.*]